(12) United States Patent
Jung et al.

(10) Patent No.: US 7,847,682 B2
(45) Date of Patent: Dec. 7, 2010

(54) METHOD AND SYSTEM FOR SENSING ABNORMAL SIGNS IN DAILY ACTIVITIES

(75) Inventors: Ho Youl Jung, Daejeon (KR); Soo Jun Park, Seoul (KR); Seon Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 272 days.

(21) Appl. No.: 12/105,386

(22) Filed: Apr. 18, 2008

(65) Prior Publication Data

US 2009/0066501 A1  Mar. 12, 2009

(30) Foreign Application Priority Data

Sep. 7, 2007  (KR) .................... 10-2007-0091126

(51) Int. Cl.
   *G08B 19/00*  (2006.01)
(52) U.S. Cl. .................................. 340/522; 340/573.1
(58) Field of Classification Search ............... 340/522, 340/573.1, 573.4; 379/38–40; 707/6
   See application file for complete search history.

(56) References Cited

U.S. PATENT DOCUMENTS 6,856,249 B2 * 2/2005 Strubbe et al. ........... 340/573.1

| | | | | |
|---|---|---|---|---|
| 6,989,742 B2 * | 1/2006 | Ueno et al. | ........... | 340/539.14 |
| 7,002,463 B2 | 2/2006 | Wakabayashi | | |
| 7,145,462 B2 * | 12/2006 | Dewing et al. | ........... | 340/573.1 |
| 2006/0033625 A1 * | 2/2006 | Johnson et al. | ......... | 340/573.1 |

FOREIGN PATENT DOCUMENTS

| KR | 1020040089709 A | 10/2004 |
|---|---|---|
| KR | 1020050090947 A | 9/2005 |
| KR | 1020060122072 A | 11/2006 |
| WO | 03/075243 A1 | 9/2003 |

OTHER PUBLICATIONS

Sangmin Yi, et al; "A Sensor Web System Supporting for Senior's Comfortable Life" knu-SCS, vol. 15, No. 1, Jun. 2007.

* cited by examiner

*Primary Examiner*—John A Tweel, Jr.
(74) *Attorney, Agent, or Firm*—Ladas & Parry LLP

(57) ABSTRACT

There are provided a method and system for sensing abnormal signs in daily activities, the method comprising, at the system, sensing the daily activities, reading previously stored daily activity information, generating a daily activity sequence based thereon, sensing the abnormal signs from the daily activity sequence by using a preset sequence alignment algorithm, and providing the sensed abnormal signs to a user. As described above, the abnormal signs, which should be checked to provide care services, are sensed via changes in a daily activity pattern and added to a care service system that will be installed in welfare facilities for the aged or a home of a solitary old person, thereby effectively sensing the abnormal signs in daily activities of the aged.

20 Claims, 4 Drawing Sheets

METHOD AND SYSTEM FOR SENSING ABNORMAL SIGNS IN DAILY ACTIVITIES

CROSS-REFERENCE TO RELATED APPLICATIONS

This application claims the priority of Korean Patent Application No. 2007-0091126 filed on Sep. 7, 2007, in the Korean Intellectual Property Office, the disclosure of which is incorporated herein by reference.

BACKGROUND OF THE INVENTION

1. Field of the Invention

The present invention relates to a method and a system for sensing abnormal signs in daily activities, and more particularly, to a method and a system aligning information on daily activities of a human into a daily activity sequence according to a time slot and sensing abnormal signs in the daily activities.

The present invention was supported by the IT R&D program of MIC/IITA [2006-S-007-02, titled: Ubiquitous Health Monitoring Module and System Development].

2. Description of the Related Art

As aging is rapidly coming, necessity of cares for old people increases. As requests for care services for patients requiring help of others increases, various systems for care services have been developed.

For care services, recently, there have been developed technologies of tracking and monitoring daily activities of a person and recognizing the daily activities of the person by analyzing tracked data. Particularly, there have been developed systems for remote-controlling a person whose state should be periodically checked, such as patients or old persons. Generally, such remote-controlling systems obtain a bio signal specialized to diseases such as diabetes and check whether a value of the bio signal is absolutely abnormal. In this case, it is more important to construct a system and obtain an accurate bio signal with integrity than algorithms for calculation.

In the case of general remote-control systems, required sensors are installed in facilities such as home, sanatoria, asylum, and hospitals and an identification sensor is installed to a person to be tracked, particularly, to an old person, thereby analyzing a sensor signal capable of being periodically obtained.

However, general remote-control systems are limited to detecting what activity the person executes or what a state is.

SUMMARY OF THE INVENTION

An aspect of the present invention provides a method and a system for sensing abnormal signs in a life pattern via changes of a daily activity pattern, in addition to detecting activities and state of a person.

An aspect of the present invention also provides a method and a system for receiving daily activities, generating a daily activity sequence based on the daily activities, for each time slot, and sensing abnormal signs in the daily activities from the daily activity sequence by using a sequence alignment algorithm.

According to an aspect of the present invention, there is provided a method of sensing abnormal signs in daily activities, the method including: previously storing daily activity information obtained by sensing daily activities; reading the previously stored daily activity information; generating a daily activity sequence based on the read daily activity information; sensing abnormal signs from the daily activity sequence by using a preset sequence alignment algorithm; and providing the sensed abnormal signs to a user.

According to another aspect of the present invention, there is provided a system for sensing abnormal signs of daily activities, the system includes: a daily activity database previously storing daily activity information obtained by sensing the daily activities; and a sensing server generating a daily activity sequence based on the daily activity information read from the daily activity database and sensing the abnormal signs from the generated daily activity sequence by using a sequence alignment algorithm.

In this case, the sensing server may include: a daily activity information input unit reading the previously stored daily activity information; a daily activity sequence generation unit generating the daily activity sequence based on the daily activity information read by the daily activity information input unit; an abnormal sign sensing unit receiving the generated daily activity sequence from the daily activity sequence generation unit and sensing the abnormal signs from the received daily activity sequence by using the sequence alignment algorithm previously set; and a user service unit providing the abnormal signs sensed by the abnormal sign sensing unit to a user.

As described above, the abnormal signs, which should be checked to provide care services, are sensed via changes in a daily activity pattern and added to a care service system that will be installed in welfare facilities for the aged or a home of a solitary old person, thereby effectively sensing the abnormal signs in daily activities of the aged.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. Only, in describing operations of the exemplary embodiments in detail, when it is considered that a detailed description on related well-known functions or constitutions may make essential points of the present invention be unclear, the detailed description will be omitted.

Daily activities indicate previously defined activities that are essential for living, such as eating or sleeping. Hereinafter, in the present embodiment, the daily activities will be described by considering sleeping, eating, easing nature, going-out, a rest, exercises, recreation, and communication, which are given as input. When necessary, other activities may be applied. The daily activities are sensed by an activity tracking method, classified, and previously stored.

A method and a system for sensing abnormal signs in daily activities of a human by receiving information on previously stored daily activities, according to an exemplary embodiment of the present invention, will be described. A configuration of the system for sensing abnormal signs in daily activities, according to an exemplary embodiment of the present invention, will be described in detail with reference to the attached drawings.

Figure 1:
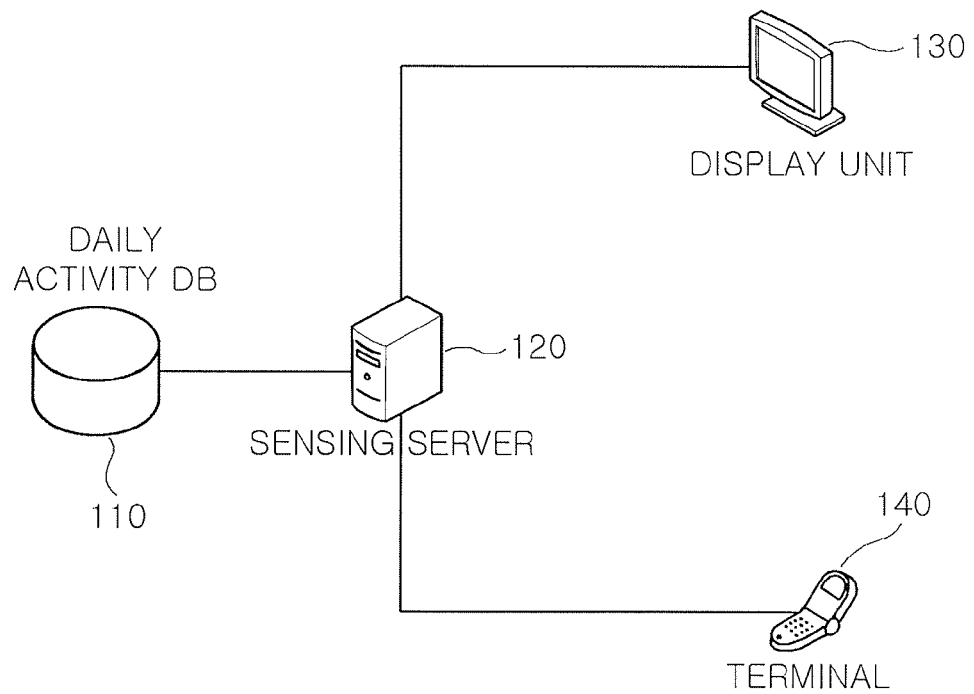
FIG. 1 is a block diagram illustrating a configuration of a system for sensing abnormal signs in daily activities, according to an exemplary embodiment of the present invention.
Figure 2:
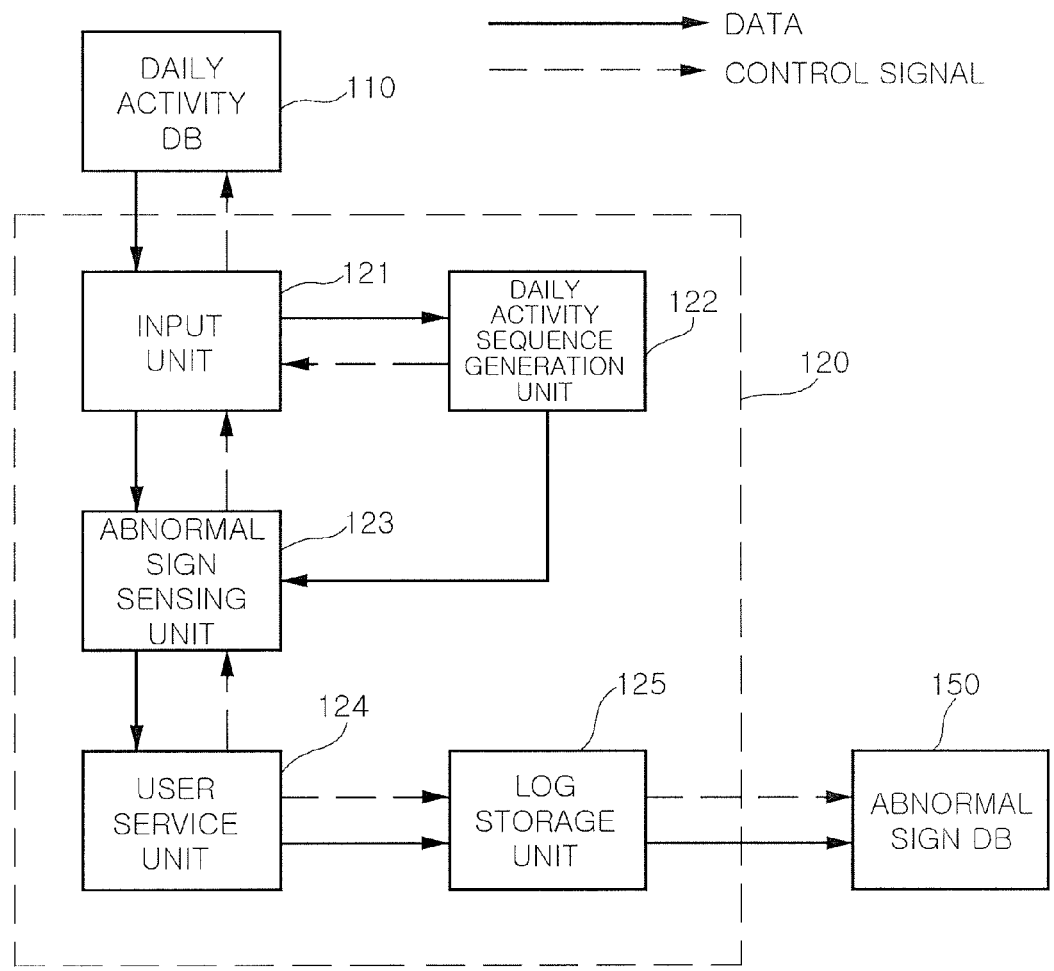
FIG. 2 is a block diagram illustrating a configuration of a sensing server in the system of FIG. 1.

FIG. 1 is block diagram illustrating the configuration of the system for sensing abnormal signs in daily activities, according to an exemplary embodiment of the present invention. FIG. 2 is a block diagram illustrating a configuration of a sensing server 120 in the system of FIG. 1.

Referring to FIG. 1, the system includes a daily activity database 110 previously storing daily activities and the sensing server 120 to which a display unit 130, such as a monitor of a personal computer, and a terminal 140 are connected.

The daily activity database 110 previously senses and classifies daily activities of a person and previously stores the daily activities. The stored daily activities are stored together with time information thereof. That is, when there is present a daily activity of sleeping, the daily activity database 110 stores time information $t_s$ and $t_e$ with respect to the daily activity of sleeping. Information on the previously stored daily activities is transferred, as input data, to the sensing server 120. The daily activity information may be formed of a composition shown in Equation 1.

$$\text{Unit of daily activity information} = \{ADL_i, t_s, \text{ and } t_e\} \quad \text{Equation (1)}$$

wherein $ADL_i$ indicates one of the daily activities of sleeping, eating, easing nature, going-out, a rest, exercises, recreation, and communication, $t_s$ indicates a start time, and $t_e$ indicates an end time.

Referring to FIG. 2, the sensing server 120 may include an input unit 121, a daily activity sequence generation unit 122, an abnormal sign sensing unit 123, a user service unit 124, and a log storage unit 125.

The input unit 121 transmits control signals from the daily activity sequence generation unit 122 and the abnormal sign sensing unit 123 to the daily activity database 110 and receives the previously daily activity information from the daily activity database 110.

The daily activity sequence generation unit 122 generates a daily activity sequence by expressing the daily activities in a sequence for each time slot, according to a time basket $T_b$ determined with respect to the daily activity information received from the input unit 121, and generates an average daily activity sequence by using a daily activity sequence of a previous day and a daily activity sequence of today. In this case, the time basket $T_b$ may be generally considered as 30 minutes or 10 minutes. That is, a daily activity sequence is generated by considering each time as unit of 30 minutes ($T_b$=30 min).

The daily activity sequence generation unit 122 requests the abnormal sign sensing unit 123 of calculating the abnormal signs at a certain point in time of a day, for example, a point in time of checking whether there is present an abnormality in daily activities in a day.

The abnormal sign sensing unit 123 senses the abnormal signs by comparing the generated daily activity sequence with other daily activity sequences by using a sequence alignment algorithm generally used in bioinformatics. That is, the abnormal sign sensing unit 123 calculates a similarity between daily activity sequence $ADLS_i$ generated on a specific day i and daily activity sequence $ADLS_j$ generated on another specific day j by performing the sequence alignment algorithm thereon. In this case, the certain day may be an average daily activity sequence of several days.

When abnormal signs are sensed, the user service unit 124 displays the sensed abnormal signs on the display unit 130. When the sensed abnormal signs relate to the easing nature or the eating, which correspond to abnormality of a body, the user service unit 124 transmits a short message to the terminal 140 of a user such as a nurse or family to inform the abnormal signs.

The log storage unit 125 stores a log with respect to the sensed abnormal signs and transfers the log to the abnormal sign database 126.

The method of sensing abnormal signs at the sensing server 120 will be described in detail with reference to the attached drawings.

Figure 3:
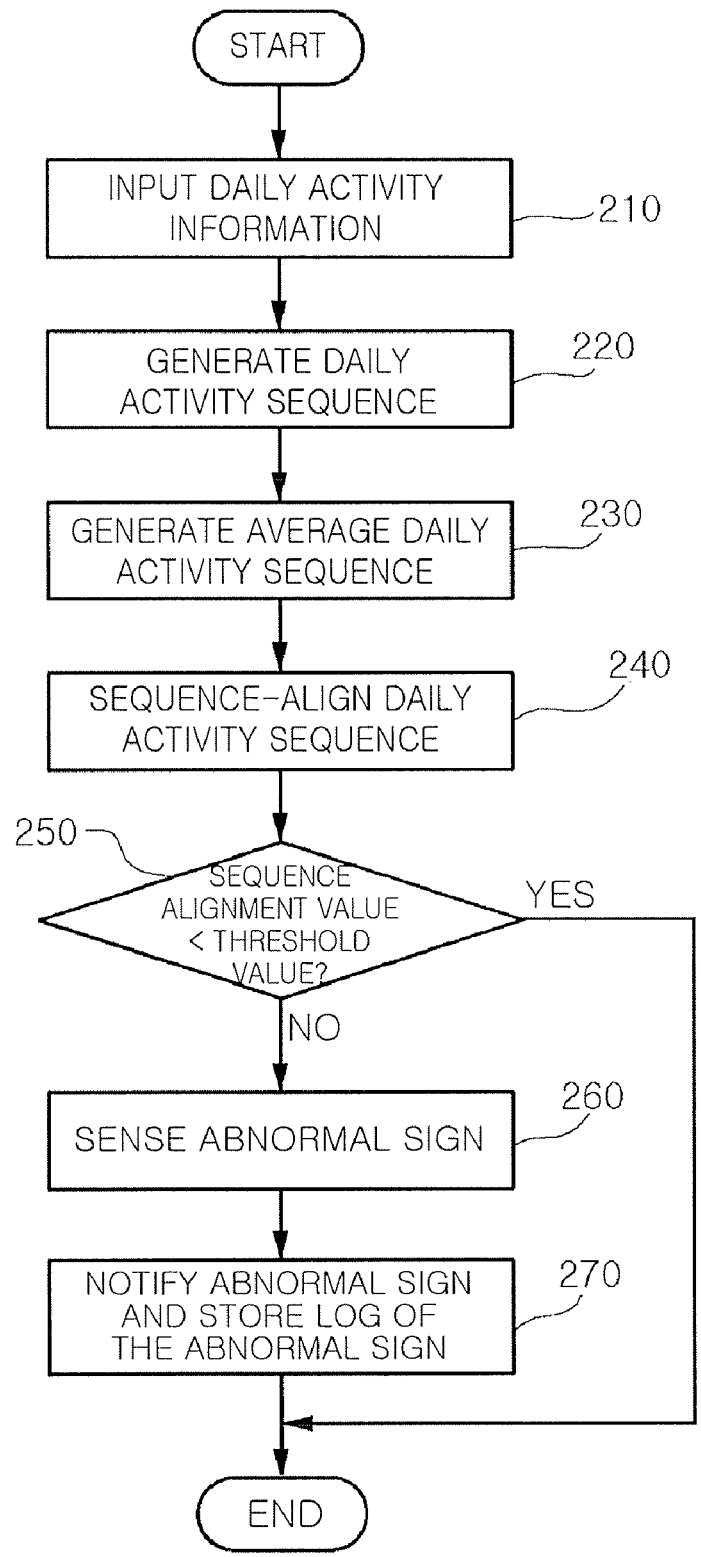
FIG. 3 is a flowchart illustrating a process of sensing abnormal signs in daily activities, at the sensing server of FIG. 2, according to an exemplary embodiment of the present invention.

FIG. 3 is a flowchart illustrating the method of sensing abnormal signs at the sensing server, according to an exemplary embodiment of the present invention.

In 210, the sensing server 120 receives previously stored daily activity information from the daily activity database 100. In 220, the sensing server 120 generates a daily activity sequence by using the received daily activity information.

In 230, the sensing server 120 generates an average daily activity sequence by using a daily activity sequence of a previous day and a daily activity sequence of today. In this case, the average daily activity sequence is determined by voting based on the frequency of daily activities in a time basket $T_b$. For example, when there are present 25 times of eating, 3 times of rest, and 2 times of exercise in a time basket of 12:00 to 12:30, an average daily activity sequence of the time basket is determined to be the eating. The average daily activity sequence is used as a reference for a sequence alignment algorithm when sensing the abnormal signs.

In 240, the sensing server 120 sequence-aligns the generated daily activity sequence by using the sequence alignment algorithm to determine whether there are present abnormal signs of daily activities in the generated daily activity sequence. A detailed description on the sequence alignment will be described in detail with reference to FIG. 4.

In 250, the sensing server 120 checks whether a sequence alignment value obtained by the sequence alignment is a threshold value or less and finishes operation when the sequence alignment value is greater than the threshold value. On the other hand, when the sequence alignment value is the threshold value or less, in 260, the sensing server 120 determines that the abnormal signs occur in a life pattern, in 270, notifies the abnormal signs to the nurse and the family via the display unit 130 and the terminal 140, and stores a log of the sensed abnormal signs in the log storage unit 125.

Figure 4:
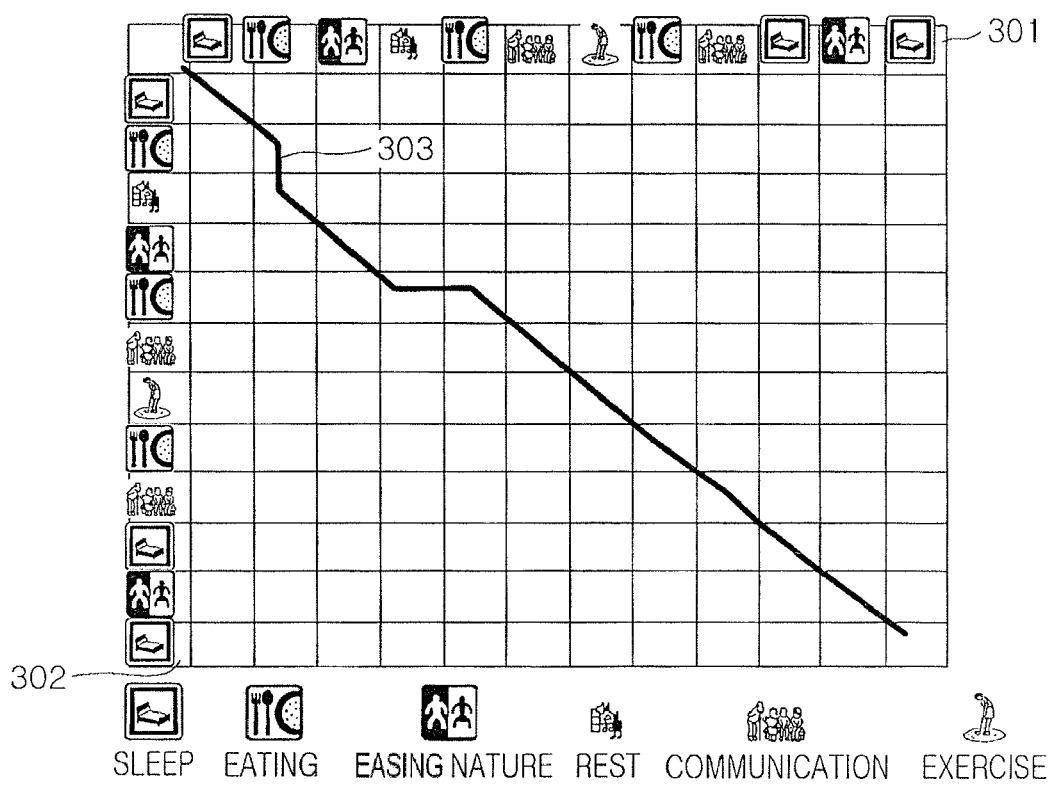
FIG. 4 is a graph illustrating an example of sequence alignment to sense abnormal signs, according to an exemplary embodiment of the present invention.

In a process of sensing the abnormal signs, the sequence alignment using the sequence alignment algorithm as shown in FIG. 4 will be described in detail. The sequence alignment may be expressed in a dynamic programming algorithm of following Equation 2.

$$M_{i,j} = \begin{cases} M_{i-1,j-1} + S(ADLS_i, ADLS_j) \\ M_{i-1,j} + S(ADLS_i, ADLS_j) \\ M_{1,j-1} + S(ADLS_i, ADLS_j) \end{cases} \quad \text{Equation (2)}$$

where ADLS indicates daily activity sequence, $M_{i,j}$ indicates a value of a point where ith daily activity sequence of 302 meets jth daily activity sequence of 301 in a matrix formed of two daily activity sequences, $M_{0, \{j=0,...,\text{ and } n\}}=0$, $M_{\{i=0,..., \text{ and } n\}, j=0}$. $S(ADLS_i, ADLS_j)$ indicates a score when daily activities of sleeping, eating, easing nature, going-out, a rest, exercises, recreation, and communication are matched, respectively, that is a sequence alignment value in which a positive value is given when identical daily activities are matched, and a relatively low value is given when different daily activities are matched. However, in this case, when the importance is given for each user and approximately similar daily activities such as a rest and recreation are matched, a relatively low value is given, thereby giving a high score when different daily activities are matched.

As shown in FIG. 4, in the case of 303, up to second meal activities, daily activities of 301 and 302 are identical to each other. However, since third daily activities of 301 and 302 are different from each other, such as a toilet and a game room, a penalty for discordance therebetween, a negative score is given. That is, when progressing as a diagonal line, it is shown that positive scores are continuously given. When vertically or horizontally moving, it is shown that negative scores are generally given. The threshold value that is a reference for determining whether the calculated value of the sequence alignment is abnormal may be experimentally determined.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for sensing abnormal signs in daily activities, the method comprising:
   previously storing daily activity information obtained by sensing daily activities;
   reading the previously stored daily activity information;
   generating a daily activity sequence based on the read daily activity information;
   sensing abnormal signs from the daily activity sequence by using a preset sequence alignment algorithm which performs a sequence alignment on the daily activity sequence and a reference daily activity sequence and assigns a score based on at least aligned and misaligned daily activities of the sequence alignment to obtain the similarity between the daily activity sequence and the reference daily activity sequence; and
   providing the sensed abnormal signs to a user.

2. The method of claim 1, wherein the generating a daily activity sequence based on the read daily activity information comprises:
   generating the daily activity sequence based on daily activity information in a day from the read daily activity information; and
   generating an average daily activity sequence as the reference daily activity sequence by using daily activity sequences of previous days and the generated daily activity sequence.

3. The method of claim 2, wherein the daily activity sequence is obtained by showing daily activities in a sequence for each time slot according to a preset time basket with respect to the daily activity information.

4. The method of claim 3, wherein the average daily activity sequence is generated by voting based on the frequency of the daily activities in the preset time basket and is used as a reference of the sequence alignment algorithm.

5. The method of claim 1, wherein the sensing abnormal signs from the daily activity sequence by using a preset sequence alignment algorithm comprises:
   sequence-aligning the generated daily activity sequences by using the sequence alignment algorithm;
   comparing a sequence alignment value obtained by the sequence-alignment, with a threshold value; and
   determining as the abnormal signs when the sequence alignment value is the threshold value or less.

6. The method of claim 5, wherein the aligning the generated daily activity sequences by using the sequence alignment algorithm comprises:
   determining a similarity between a reference daily activity sequence and the generated daily activity sequence;
   giving a positive sequence alignment value to the sequence-alignment when daily activity sequence of the reference daily activity sequence and daily activity information of the generated daily activity sequence are matched to each other; and
   giving a relatively low sequence alignment value to the sequence-alignment when the daily activity information of the reference daily activity sequence and the daily activity information of the generated daily activity sequence are not matched to each other.

7. The method of claim 1, further comprising storing information on the sensed abnormal signs.

8. The method of claim 1, wherein the daily activity information comprises daily activities and a start time and an end time of each of the daily activities.

9. A system for sensing abnormal signs of daily activities, the system comprises:
   a daily activity database previously storing daily activity information obtained by sensing the daily activities; and
   a sensing server generating a daily activity sequence based on the daily activity information read from the daily activity database and sensing the abnormal signs from the generated daily activity sequence by using a sequence alignment algorithm which performs a sequence alignment on the daily activity sequence and a reference daily activity sequence and assigns a score based on at least aligned and misaligned daily activities of the sequence alignment to obtain the similarity between the daily activity sequence and the reference daily activity sequence.

10. The system of claim 9, wherein the sensing server comprises:
    a daily activity information input unit reading the previously stored daily activity information;
    a daily activity sequence generation unit generating the daily activity sequence based on the daily activity information read by the daily activity information input unit;
    an abnormal sign sensing unit receiving the generated daily activity sequence from the daily activity sequence generation unit and sensing the abnormal signs from the received daily activity sequence by using the sequence alignment algorithm previously set; and
    a user service unit providing the abnormal signs sensed by the abnormal sign sensing unit to a user.

11. The system of claim 10, further comprising a log storage unit storing log information with respect to the sensed abnormal signs.

12. The system of claim 10, wherein the daily activity sequence generation unit generates the daily activity sequence by expressing daily activities in a sequence, for each time slot according to a preset time basket.

13. The system of claim 10, wherein the daily activity sequence generation unit generates an average daily activity sequence by voting based on the frequency of the daily activities in a preset time basket and transferring the generated average daily activity sequence to the abnormal sign sensing unit to be used as a reference of the sequence alignment sequence.

14. The system of claim 10, wherein the abnormal sign sensing unit, when a sequence alignment value obtained by sequence-aligning the daily activity sequences by using the sequence alignment algorithm is a threshold or less, determines as the abnormal signs.

15. The system of claim 14, wherein the abnormal sign sensing unit, when daily activity information of a reference daily activity sequence and daily activity information of the generated daily activity sequence are matched to each other, gives a positive sequence alignment value to the sequence-alignment, when the daily activity information of the reference daily activity sequence and the daily activity information of the generated daily activity sequence are not matched to each other, gives a relatively low sequence alignment value to the sequence-alignment, while performing the sequence-alignment.

16. The system of claim 9, wherein the daily activity information comprises daily activities and a start time and an end time of each of the daily activities.

17. The system of claim 10, wherein the user service unit displays information on the sensed abnormal signs on a monitor.

18. The system of claim 17, wherein the user service unit transmits the information on the sensed abnormal signs to a user terminal by using a short message.

19. The method of claim 1, wherein the sequence alignment algorithm is a dynamic programming algorithm.

20. The system of claim 9, wherein the sequence alignment algorithm is a dynamic programming algorithm.

* * * * *